Figure 1:
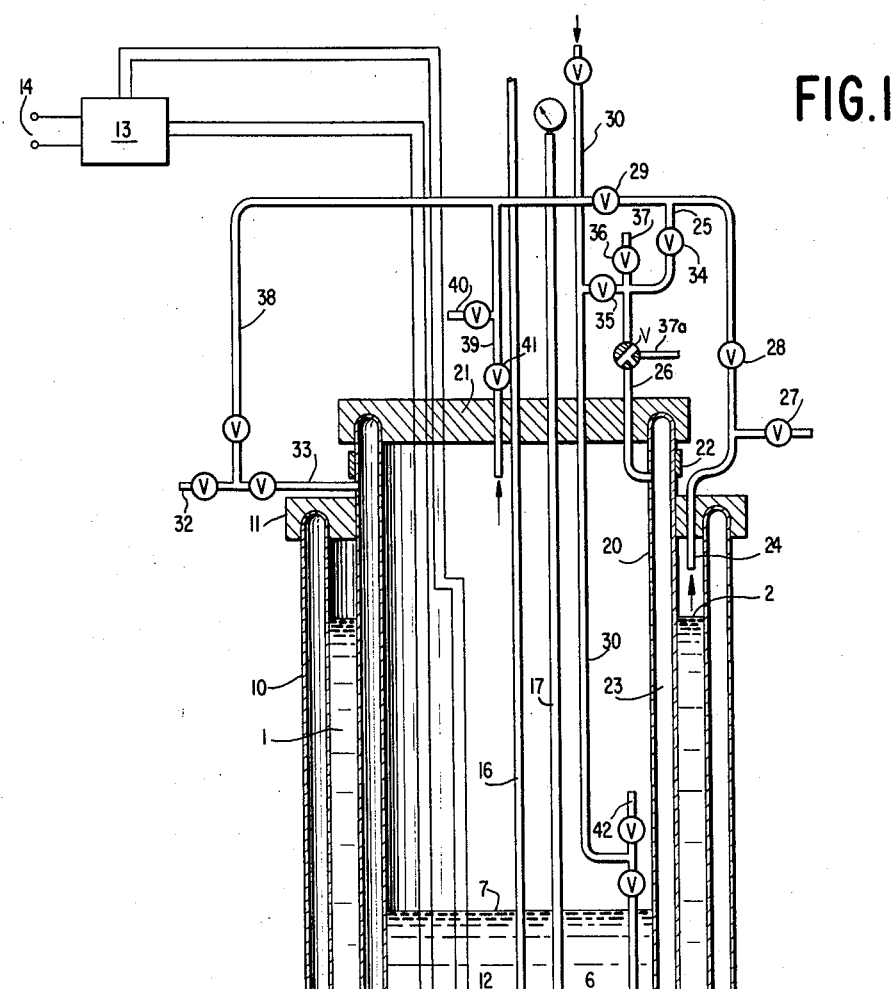

July 20, 1965 R. G. STEINHARDT, JR 3,195,620
PROCESS AND APPARATUS FOR MAINTAINING CONSTANT LOW TEMPERATURES
Filed June 14, 1963

INVENTOR.
RALPH G. STEINHARDT, JR.
BY
Burns, Doane, Benedict,
Swecker and Mathis
ATTORNEYS

United States Patent Office 3,195,620
Patented July 20, 1965

3,195,620
PROCESS AND APPARATUS FOR MAINTAINING
CONSTANT LOW TEMPERATURES
Ralph G. Steinhardt, Jr., Hollins College, Va., assignor to
Hollins College Corporation, Hollins College, Va., a
non-profit corporation of Virginia
Filed June 14, 1963, Ser. No. 287,847
18 Claims. (Cl. 165—2)

This invention relates to a novel system for accurate maintenance of preselected temperatures. More particularly it relates to a process and apparatus adapted to give accurate temperature control over a wide range of temperatures. Still more particularly it relates to a process and apparatus which give accurate temperature control at temperatures below about −100° C.

Since temperature determines to a large degree the energy or reactivity of matter, temperature control is one of the important problems both in scientific investigations and in industrial production processes. In devices and methods used for themostatic control several factors are most important; first the range of temperatures in which the thermostatic system can operate, and second, the effectiveness and accuracy of the available control system to maintain the desired temperature level. A third factor which is often also very important is the flexibility of the system, that is, its ability to maintain two or more different temperature levels in relatively rapid succession without requiring any major changes in the control system.

For scientific work reasonably satisfactory thermostatic control can be obtained with existing devices in the temperature range extending from about −100° C. up to about 2000° C. However, except for very complicated and expensive devices, effective means are not presently available for control of freely preselected temperatures below −100° C., particularly if both very precise temperature control and flexibility are required in a given system. Such systems are needed not only in determining chemical or physical properties, such as vapor pressure, of low boiling compounds, but also in studying the behavior of solids such as metals or semiconductors at very low temperatures. Furthermore, some production processes, such as those involving separation or purification of gases may require accurate temperature control at low temperatures.

It is an object of this invention to provide a process and apparatus effective in precisely controlling temperatures, particularly at temperature levels below about −100° C. and down to about −250° C. A further object is to provide such a process and apparatus that are flexible in the sense of being readily usable over a wide range of temperature levels without requiring any major alteration in making the transition from one operating temperature to another. A still further object is to provide for the aforesaid purposes a relatively compact and inexpensive apparatus representing a minimum dead weight.

It has now been discovered that an unusually effective thermostatic system having the desired characteristics can be obtained by employing in combination a plurality of vessels placed one within the other in a moderated heat transfer relationship. In this arrangement the outer vessel contains a coolant or heat sump while the inner vessel contains essentially the bath liquid, the two being separated from each other by a thermal insulation zone or heat barrier of the proper effectiveness which, if desired, may be variable. Thermostatic control of the bath liquid is then effected by counterbalancing the refrigerant effect of the external coolant by means of a temperature responsive heating means placed within the bath liquid. The device and all of its essential components are composed of materials having low heat capacity and low heat conductivity. The thermal insulation zone between the thermostatic bath proper and the coolant is preferably one containing a gas, the latter of course being chosen such that it does not condense at the temperature of the coolant. For instance, when boiling liquid nitrogen is used as the coolant it may be advantageous to circulate gaseous nitrogen through the thermal insulation zone, though a different low boiling gas such as hydrogen or helium or even dry air may be used likewise. The effluent dry gas from the thermal insulation zone can eventually be used to blanket the thermostatic bath to prevent condensation of atmospheric moisture therein. In some cases, especially when the extraneous heat input into the thermostatic bath is considerable, it may be advantageous to use either the effluent gas from the thermal insulation zone or the evaporated coolant as a means for stirring the bath, introducing the gas near the bottom of the bath and bubbling it upwardly therethrough to equalize the temperature therein. Of course, instead of using a gas for stirring as just described, it is possible to use a mechanical stirrer, preferably one constructed of low heat capacity and low heat conductivity material such as glass. When properly designed and operated the system of this invention is capable of controlling temperatures within ±0.05° C. or better down to temperatures as low as about −250° C. If desired, the bath liquid may be kept under superatmospheric pressure so as to maintain it as a liquid over a relatively wide range of temperatures.

The nature, construction, operation and advantages of this invention will become more clearly apparent from the following description, particularly when read with reference to the accompanying drawing which is illustrative of a specific embodiment.

Figure 2:
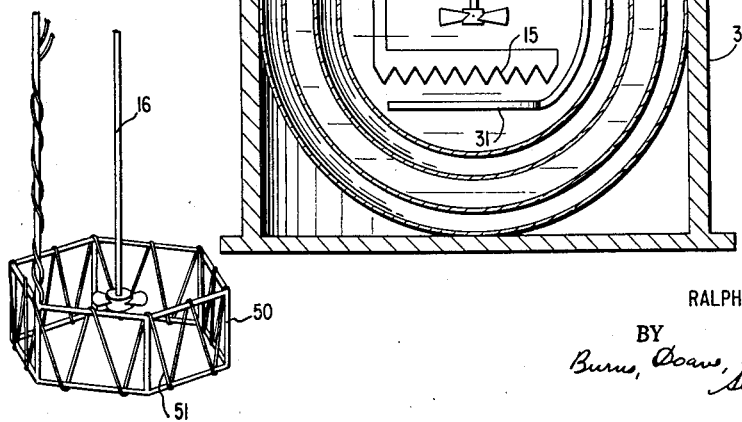

In the drawings:
FIGURE 1 is a schematic view of a thermostatic device and associated apparatus arranged according to one aspect of the present invention; and
FIGURE 2 is an isometric view of a preferred embodiment of a heating element of low heat capacity and low heat conductivity which is particularly useful in the present invention, and of a stirrer cooperating therewith.

Referring to the drawing, the illustrated device comprises an outer vessel 10 which may be a Dewar flask or a similar double-walled vessel made of glass or the like which has been evacuated and silvered so as to minimize heat transfer between the contents of the flask and its outer environment or any other equivalent container effectively insulated by means of plastic foam or the like. Flask 10 may be set in a wooden stand 3 or other known means may be used to hold it steady. Positioned within vessel 10 and supported by means of a mechanical clamp 22 is another double-walled glass flask 20. A cover 11 is fitted to close off the outer vessel 10 and a cover 21 is fitted to close off the inner vessel from the atmosphere. Within the inner flask is positioned a temperature sensing device 12 such as a thermistor or thermocouple having a short time constant, i.e., one that responds rapidly to any change in temperature. This temperature sensing device is connected in an otherwise well-known manner to an electric relay 13 which draws power from a power source 14 and is adapted to control the heat output of heater 15 as needed to maintain the bath temperature constant. Heat is thus desirably supplied at a rate of less than 0.01 watt per cm.³ of bath liquid.

To minimize the thermal inertia of the system and thereby increase its accuracy of temperature control, it is advantageous to use an electric heater as well as all other components in the bath which are constructed of such material and in such a manner that heat flow between the constant temperature bath and the atmosphere or other external environment is minimized. A particularly effective, low power heater of this kind has been developed for this purpose in the form illustrated in FIGURE 2. It consists of a hexagonal framework 50 constructed of glass rods (e.g., about 5 mm. in diameter), on which framework is looped a thin platinum resistance wire 51 in such a manner that the heat input required for temperature control is distributed over a relatively large portion of the bath liquid 6. Desirably the framework of the heater is sufficiently large to accommodate within it stirrer 16 so that constant and uniform temperature can be rapidly attained. For control, the heater is operated on an on-off principle, adjusting the power output of the heater by means of control of the input voltage. This adjustment is made in such a way as to obtain a heating-cooling cycle which is as symmetrical as possible, that is, the power input is initially adjusted manually in such a way that the heating rate with the heater on is approximately equal to the cooling rate with the heater off.

Under ordinary operating conditions an appropriate dry gas of the kind discussed further below is sealed within space 23 at atmospheric pressure and at room temperature. Alternatively, depending on the rate of heat transfer desired, it can be advantageous for the gas in space 23 to be at reduced pressure when a low rate of heat transfer is desired or at superatmospheric pressure if a relatively high rate of heat transfer is desired. In some cases, especially where a continuous process is conducted within the bath, it may be desirable to use a flowing gas rather than a static gas within the heat moderating zone 23. In such cases by proper adjustment of gas flow through zone 23 heat transfer between the coolant and the bath liquid may be adjusted such that, when steady state conditions are reached, only slightly more heat flows from the bath liquid 6 into coolant 1 than flows into the bath liquid from the environment as well as from external sources such as schematically shown isoteniscope bulb 17 or other test device or process which is being kept at the predetermined temperature. Consequently, little heat from heater 15 should normally be required to maintain the temperature of the thermostatic bath constant at the desired temperature level. It is necessary to provide a stirring means for the bath to assure even temperature distribution therein. Such stirring can ordinarily be accomplished by mechanical stirrer 16. However, such agitation may likewise be accomplished by introducing a dry gas such as nitrogen from an appropriate source through line or dip tube 30 which terminates in porous disk 31 near the bottom of the vessel.

By using a relatively warm gas and carefully controlling its volume in response to the temperature determined by the temperature sensing means 12, it may be possible to omit the heater 15 and to use the warm gas introduced through line 30 and porous plate 31 not only to stir the bath but also to supply the heat required to balance the cooling effect of the coolant. In such an arrangement it will be necessary, of course, to provide an independent means of agitation. If desired a mechanical stirrer 16 and a porous disk 31 may be used in the same bath 6.

Furthermore, while the device shown contains a static bath, it will be understood that the present invention can also be used to provide a thermostatically controlled circulating bath by circulating the liquid from bath 6 by means of a circulating pump and suitable insulated piping.

In some cases, as in fractional liquefaction of mixed gas streams, a plurality of the novel thermostatic devices may be used in series each containing a progressively lower temperature bath. Such a series of cold thermostatic baths can be used, for instance, for the recovery of xenon from exhaled anaesthetic gases. Xenon is recognized as an almost ideal anaesthetic, effective, non-toxic and apparently without any side effects. However, heretofore its recovery in pure form has been prohibitive in cost. The present invention provides an inexpensive means for recovering xenon for virtually indefinite re-use in anaesthesia.

It will be understood, of course, that where a series of these devices are used, a particularly efficient arrangement involves telescoping the progressively warmer baths one within the other, with gas barriers between each. Such telescoping not only conserves refrigeration but can be used as a means of increasing the precision of temperature control of the inner bath.

A wide range of operating conditions is available for the novel thermostatic system depending on the choice of coolant, bath liquid and insulating medium, as well as on the conditions maintained in the system, such as the rate of gas flow through the insulating zone, the pressure maintained on the bath liquid, and, most importantly, the temperature setting of the heating means.

For instance, operating at atmospheric pressure and wishing to maintain the bath liquid at about −50° C. it is convenient to use a Dry Ice/acetone slurry (producing a temperature of about −80° C.) as the coolant 1 in outer flask 10, normal hexane as the bath liquid 6 in inner flask 20, and dry air as the insulating gas barrier in gas space 23. A convenient system for maintaining a bath liquid at a temperature between about −100° and −150° C. can be set up using boiling liquid nitrogen as the coolant, liquid propane as the bath liquid and dry nitrogen as the gas barrier. The main requirements in choosing the fluids for use in this invention are that (1) the coolant must be capable of providing a constant temperature lower than that desired in the thermostatic bath, e.g., it should have a first-order transition point at least about 10° C. below, but preferably about 25° to 100° C. below the temperature desired to be maintained in the main bath 6; (2) the bath liquid 6 itself must be a substance which remains in the liquid state in the intended working temperature range, that is, it must have a melting point sufficiently low and a boiling point sufficiently high to allow the bath to remain liquid at the temperature or temperatures which are to be maintained constant; and (3) the gas used as the heat barrier between the coolant and the bath liquid must be one which does not liquefy, and does not have components which liquefy when placed in indirect heat exchange relationship with the coolant used. Thus, where extremely low bath temperatures such as −250° C. are needed, liquid helium (B.P. −268.9° C.) may be used as the coolant and hydrogen under pressure as the bath liquid. Liquid nitrogen (B.P. −195.8° C.), liquid oxygen (B.P. −183° C.), liquid methane (B.P. −161.4° C.), liquid ethylene (B.P. −103.9° C.), liquid ethane (B.P. −88.3° C.), solid carbon dioxide-acetone (−80° C.), liquid propane (B.P. −42.3° C.), etc., represent other convenient coolants depending on the bath temperature desired. Depending on this temperature liquid ammonia, methyl chloride, dichlorodifluoromethane, ethyl chloride, dichlorotetrafluoroethane, trichlorofluoromethane and other liquids, including also the ones mentioned above as suitable coolants, may be used as bath liquids provided that they have a boiling point sufficiently higher than the temperature of the coolant used and a melting point sufficiently low not to freeze at the temperature to be produced. Propane and dichlorodifluoromethane are particularly convenient bath media because they remain liquid over a very wide range of temperatures.

For instance, when desiring to maintain a temperature of −130° C., the annular space 1 between flasks 10 and 20 is filled with liquid nitrogen to form a level 2, and liquid propane is added to the inner flask to form a level 7 therein while the temperature setting of the temperature controller 13 is set at the desired temperature. Dry nitrogen gas at room temperature (21° C.) is passed as a heat shield through lines 32 and 33 into the double wall of the inner flask 20 and sealed therein. When the upper portion of the double-walled vessel 20 is maintained at a temperature substantially above that of the bath 6, e.g., at room temperature, the relatively warm gas molecules at the top of zone 23 diffuse downward and thereby provide a heat leak helping to prevent the temperature of the gas barrier from becoming too cool for efficient operation.

Where a relatively high rate of cooling of the bath is needed, the cold vaporized coolant can represent a convenient supply of gas to be used in the heat shield. It can be withdrawn from the gas space above the coolant level 2 via line 24 and introduced into the space between the double walls or jacket of inner flask 20 via lines 25 and 26, valves 27, 29, 35 and 36 being closed while valves 28 and 34 are open. The gas thus introduced is eventually removed from the jacket either via line 32 to the atmosphere or via line 38 for further use in the process. Where a greater volume of gas flow is required in the heat barrier 23 than is provided by the evaporating coolant, dry nitrogen or other gas from an extraneous source may be injected via line 37 instead of, or in addition to, the coolant vapors. In fact, it is often advantageous to mix the cold coolant vapors with such extraneous gas to adjust the volume and temperature of the resulting gas stream to the optimum values.

The gas withdrawn via line 38 may be used to stir the bath liquid by bubbling it through the bath via line 30 and porous disk 31. As an alternate, the evaporated coolant, optionally with added extraneous dry gas, may be passed directly from the refrigeration zone via lines 24, 25 and 30 to porous disk 31 to agitate the bath. In this event only extraneous gas introduced via lines 32 and 33 is used as the heat shield, being vented from the jacket of vessel 20 to the atmosphere via lines 26 and 37a. When it is not desired to use the evaporated coolant at all it may be vented via line 24 and valve 27. Gas from above the bath liquid may be vented via lines 39 and 40. A throttle valve 41 may be installed in vent line 39 if it is desired to maintain the bath liquid under pressure. When mechanical means rather than a gas is used to agitate the bath liquid it may be desirable to bleed at least some dry gas into the system through line 30 and to discharge such gas via line 42 into the inner flask 20 above level 7 of the bath liquid to prevent condensation of atmospheric moisture within the flask in cases where the system is not tightly capped. Alternatively, the evaporated gas from coolant 1 can be introduced as the blanket gas into the inner vessel via lines 24, 25, 30 and 42. Blanket gas is vented through lines 39 and 40.

When use of the system at a given temperature is completed it can be rapidly brought to a higher temperature level by appropriately resetting the temperature controller. Conversely, if it is desired to progress from relatively high working temperatures to lower ones, such transition is facilitated by passing cold evaporated coolant from the coolant zone through the gas barrier 23, coupled, of course, with a proper resetting of the heater controls. Thus, for instance, using liquid nitrogen as the coolant, propane as the bath liquid, and a dry gas such as nitrogen as the heat barrier, constant working temperatures between about $-100°$ and $-150°$ C. can be readily maintained with an accuracy of $\pm 0.05°$ C. or better, and change from one temperature level to a different one can be quickly achieved.

The operation of the novel system is not dependent on the particular configuration or mutual geometric relationship of the coolant 1 and bath 6. For example, the body of coolant 1 may be placed within the body of bath 6 if maximum economy in use of coolant is desired, though such an arrangement may be mechanically more complex.

It should also be understood that, instead of using a boiling liquid as the coolant it is possible to use a liquid at its freezing point in equilibrium with its sold phase. However, this is a more cumbersome means of providing a constant temperature coolant bath than the use of a liquid at its boiling point.

Having described the invention and its operation it will be understood that various modifications thereof are possible without departing from the spirit of the invention or from the scope of the appended claims.

What is claimed is:

1. A process for producing and maintaining a preselected low temperature in the range below $-100$ C. which comprises confining a body of a first liquid within a double-walled zone, immersing said double-walled zone with said body of liquid in a second liquid which is confined in a second zone, thermally insulating said zones from the outside environment, maintaining said second liquid at a first-order transition point which corresponds to a constant temperature which is substantially lower than said preselected low temperature, interposing a dry gas barrier within the double walls of said double-walled zone, adjusting said gas barrier to cause said first liquid to be constantly cooled at a slow rate of cooling, measuring the temperature of said first liquid, and maintaining said first liquid at a temperature within $\pm 0.05°$ C. of said preselected temperature by heating it intermittently as required at a net heating rate approximately equal to the rate at which said first liquid is cooled when heat is not being supplied.

2. A process according to claim 1 wherein said second liquid is a liquid at its freezing point in equilibrium with its solid phase, said freezing point being at least $10°$ C. lower than said preselected low temperature.

3. A process according to claim 1 including the steps of withdrawing vapors of boiling liquid from above the said boiling refrigerant and then passing said vapors as the gas barrier between said liquid bath and said refrigerant.

4. A process for maintaining a liquid bath sequentially at a plurality of different preselected temperatures in the range between $-100°$ C. and $-250°$ C. which comprises
   (a) selecting a substance which is a liquid at all of the preselected temperatures but which becomes solid at a temperature below the lowest of said preselected temperatures, forming a liquid bath of said substance in a double-walled zone, and agitating said bath to maintain its temperature uniform;
   (b) immersing said double-walled zone in a constant-temperature pool of boiling liquid refrigerant which has a boiling point about $25°$ to $100°$ C. lower than the lowest of said preselected temperatures;
   (c) maintaining a dry gas barrier between said liquid bath and said refrigerant to cool said bath slowly below the preselected temperature while preventing it from freezing;
   (d) preselecting a first temperature sensing the temperature of said liquid bath, and when the thus sensed temperature is below said first preselected temperature supplying heat to said liquid bath intermittently at a rate of less than 0.01 watt per cm.$^3$ of bath liquid and at a net heating rate approximately equal to the rate at which the bath is cooled when no heat is supplied, said heat being supplied so as to maintain the temperature of said liquid bath constant within $\pm 0.05°$ C. as long as desired; and thereafter
   (e) preselecting a second temperature which is lower than said first preselected temperature, and supplying heat intermittently to said bath as in step (d) to maintain said second preselected temperature.

5. A process according to claim 4 wherein the refrigerant is boiling liquid nitrogen.

6. A process according to claim 4 wherein the bath liquid is propane.

7. A process according to claim 4 wherein the bath liquid is a low boiling perchlorofluorocarbon.

8. A process according to claim 4 including the steps of withdrawing vapors from above said boiling refrigerant and passing them into said double-walled zone to prevent condensation of moisture above the liquid bath therein.

9. A device adapted to maintain a preselected low temperature which comprises in combination:
- a first open top vessel which has heat insulated walls and is adapted to contain a refrigerant;
- a second open top vessel which is double-walled and positioned within and spaced inwardly from the walls of said first vessel, said second vessel being adapted to contain a bath liquid, the double walls of said second vessel defining a barrier space therebetween adapted to contain a gas;
- said first and second vessels being provided with removable insulated covers;
- a temperature sensing means of low heat capacity and low heat conductivity rapidly responsive to changes in temperature positioned within said second vessel and adapted to sense the temperature of the contents thereof;
- a low heat capacity and low heat conductivity heating means adapted to supply heat to the contents of said second vessel at an adjustable rate of less than 0.01 watt per cm.$^3$ of liquid contents in response to impulses initiated by said temperature sensing means to maintain the temperature of the contents constant;
- a gas conduit means for adjusting the gas content in said barrier space;
- and agitating means adapted to agitate liquid contained in said second vessel.

10. A device according to claim 9 wherein the upper portion of the second vessel extends upwardly through the cover of the first vessel, thereby providing a heat leak to prevent excessive cooling of the gas in said barrier space.

11. A device according to claim 9 which further comprises a valved conduit system interconnecting the space between the first and second vessels with the interior of the second vessel.

12. A device according to claim 9 wherein the heating means comprises a heating element in the form of a metallic resistance wire mounted on a framework of low heat capacity and of low heat conductivity.

13. A device according to claim 9 wherein the heating means comprises a platinum resistance wire looped around a glass framework.

14. A device according to claim 9 wherein the heating means comprises a nickel-chromium alloy resistance wire.

15. A device according to claim 9 wherein the temperature sensing element is a thermistor.

16. A device according to claim 9 wherein the temperature sensing element is a resistance thermometer.

17. A device according to claim 9 wherein said double-walled vessel and said agitating means are made of glass.

18. A device according to claim 9 wherein said agitating means comprises a dip tube adapted for blowing gas into said second vessel at a level below the heating means therein.

References Cited by the Examiner

UNITED STATES PATENTS

| | | | |
|---|---|---|---|
| 2,126,552 | 8/38 | Hollowsay | 165—39 |
| 2,645,461 | 7/53 | Brown et al. | 165—64 |
| 2,863,297 | 12/58 | Johnson | 62—45 |

OTHER REFERENCES

Rollin et al.: A Cryostat for Electrical Measurements on Semiconductors in December 1960 issue Cryogenics (pp. 75–76).

Weinstein: Long Wavelength Infrared in Aug. 21, 1959 issue Electronics (pgs. 36–37).

CHARLES SUKALO, *Primary Examiner.*